United States Patent [19]

Cirri

[11] Patent Number: 5,431,045
[45] Date of Patent: Jul. 11, 1995

[54] DEVICE AND METHOD FOR MEASURING ON EARTH THE THRUST OF THRUSTERS FOR USE IN SPACE

[75] Inventor: Gianfranco Cirri, Florence, Italy

[73] Assignee: Proel Technologie S.P.A., Florence, Italy

[21] Appl. No.: 234,571

[22] Filed: Apr. 28, 1994

[30] Foreign Application Priority Data

May 6, 1993 [IT] Italy .................................. FI93A0089

[51] Int. Cl.[6] .............................................. G01L 5/00
[52] U.S. Cl. ............................ 73/117.4; 73/862.541; 73/117.1; 73/807
[58] Field of Search .................... 73/117.4, 117.1, 116, 73/807, 862.541

[56] References Cited

U.S. PATENT DOCUMENTS

| | | | |
|---|---|---|---|
| 3,122,917 | 3/1964 | Ormond | 73/117.4 |
| 3,599,480 | 8/1971 | Krieve | 73/117.4 |
| 5,170,622 | 12/1992 | Brault et al. | 73/117.4 |

*Primary Examiner*—Richard E. Chilcot, Jr.
*Assistant Examiner*—Max Noori
*Attorney, Agent, or Firm*—McGlew and Tuttle

[57] ABSTRACT

The equipment for measuring on earth the thrust of thrusters for use in space comprises a balance (1) and a measuring means (11) which is associated with the balance in order to measure the thrust exerted by the thruster (P). The balance (1) is provided with a target (13) at which the exhaust jet from the thruster (P) is directed, whereas the thruster is mechanically free from the structure of the balance and the measuring means (11) measures the force applied to the balance in order to balance the thrust exerted on the balance by the jet from the thruster. (FIG. 3)

20 Claims, 3 Drawing Sheets

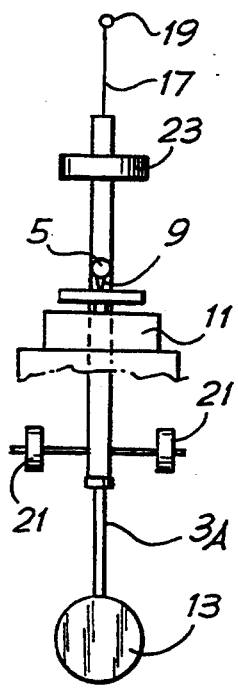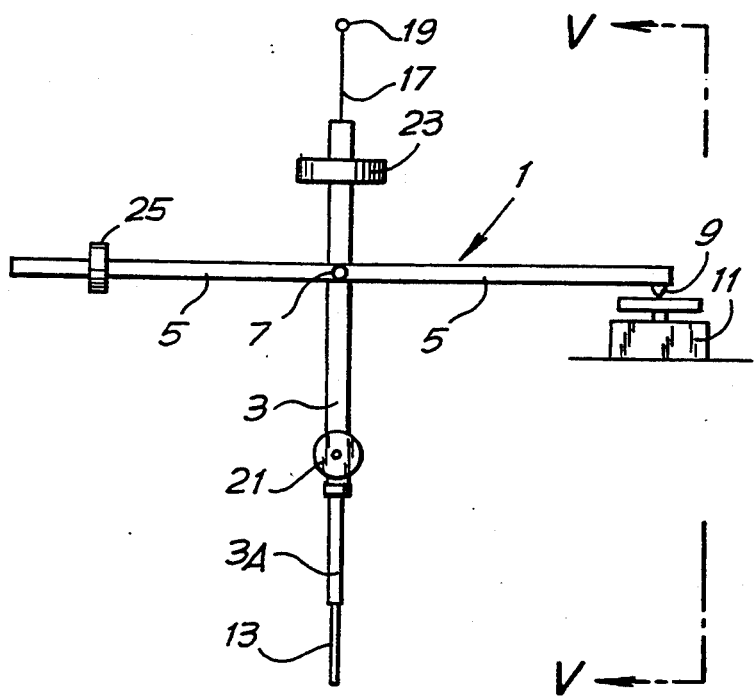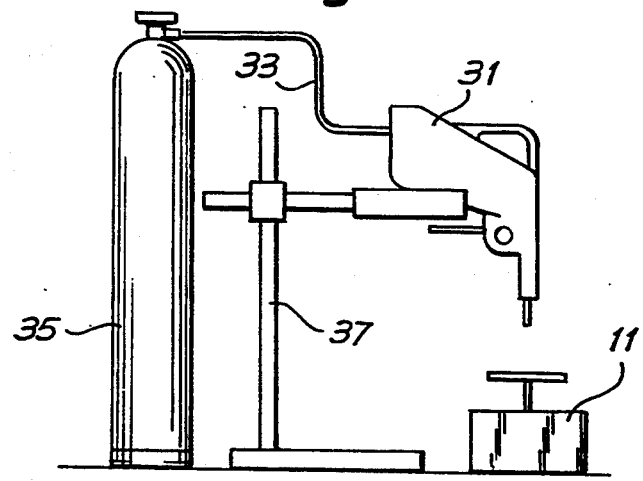

DEVICE AND METHOD FOR MEASURING ON EARTH THE THRUST OF THRUSTERS FOR USE IN SPACE

FIELD OF THE INVENTION

The invention relates to equipment for measuring on earth the thrust of thrusters for use in space, of the type which comprises a balance, and thrust measuring means.

The invention also relates to a method for measuring on earth the thrust of a thruster for use in space.

BACKGROUND OF THE INVENTION

The methods and corresponding equipment currently in use for these purposes involve suspension of the thruster on the balance. FIGS. 1 and 2 show two embodiments of conventional equipment. Both cases involve measuring equipment which uses two arms which rotate around a fulcrum F. The thruster P is disposed on one arm C, whereas the measurable balancing force acts on the other arm B.

In the known solution shown schematically in FIG. 1, in addition to the arms B and C there are shown: a cable A which serves the dual purpose of supporting the entire structure, and of acting as a torsional spring; the point of rotation F of the structure, which is prevented by the cable A from being displaced at all; the electromagnet D which counterbalances the thrust of the thruster P; and the position feed-back system E which enables the angular displacements to be reset by means of an optical system for measuring the displacements, comprising a mirror G. The measurement is thus performed on the horizontal plane and the balancing force is of an electromagnetic nature. Since the length of the arms B and C is known, the magnitude of the balancing force permits determination of the thrust T exerted by the thruster P on the structure of the balance.

In the embodiment shown schematically in FIG. 2, in addition to the arms B and C there are shown the center of rotation F of the structure, and the load cell D. The operation is similar to that described with reference to the equipment in FIG. 1.

The limits of the conventional equipment of the above-described type are derived from the fact that although the balance must measure thrusts T of approximately 1 mN to 100 mN, it must support the weight of the entire thruster, which is of the order of kilograms. In addition the friction exerted on the balance can become a force comparable to the thrusts to be measured, since the thruster P is connected to the supply system by means of electrical power cables and ducts for the propellant gas supply. These elements introduce into the system forces and damping which are difficult to quantify and reproduce. Considerable problems are caused in these test configurations by two elements, i.e. the fulcrum of the balance, and the power cables: in order for the balance to operate perfectly, the fulcrum must not give rise to friction or develop unknown forces with components in the direction of the thrust to be measured. Both requirements are difficult to obtain in equipment of the conventional type, particularly taking into account the fact that the cables constitute constraints relative to the exterior, with damping and rigidity which are difficult to reproduce exactly from one test to another.

SUMMARY AND OBJECTS OF THE INVENTION

The object of the present invention is to provide test equipment and a corresponding method of testing which overcome the disadvantages of conventional equipment, as summarized briefly above.

The object of the invention is basically equipment which is characterized in that the balance is provided with a target to which there is conveyed or directed the exhaust jet from the thruster, which in turn is disposed so as to be mechanically free from the structure of the balance, on a separate support. The method according to the invention thus provides a balance with a load cell or another equivalent means of measuring a force; provides a target on the said balance; mounts the thruster independently of the balance; starts up the thruster and conveys the exhaust jet to the target mounted on the balance; and, by means Of a load cell or an equivalent sensor, measures the reaction force exerted on the balance by a constraint.

The present invention thus uses the third law of motion (action and reaction) in order to measure the thrust of the thruster.

Since the thruster is separated from the structure of the balance, a series of measurements can be carried out by varying the distance between the target on the balance, and the thruster.

In addition to eliminating the problems associated with direct measurement of the thrust, in practice the method hereby proposed permits elimination of the internal friction which is present for example in the fulcrum of the balance.

Elimination in practice of this friction is obtained for example by making the center of rotation or fulcrum of the balance coincide with the center of gravity of the balance, and for example by suspending the balance by means of a thread attached to the center of gravity or to a point on the vertical which passes through the center of gravity. If a thread of limited flexural rigidity is selected, in practice the latter constitutes a frictionless constraint.

Further advantageous embodiments of the equipment and the method according to the invention are indicated in the attached claims.

BRIEF DESCRIPTION OF THE DRAWINGS

The invention will be better understood by following the description and the associated drawings which show a practical, non-limiting example of the invention. In the drawings:

As described above,

FIG. 4 shows a lateral view of the equipment according to the invention;

FIG. 5 shows a view taken through V—V in FIG. 4;

FIGS. 6 and 7 show the stage of calibration of the equipment before measurement on the thruster;

DETAILED DESCRIPTION OF THE PREFERRED EMBODIMENT

Figure 3:
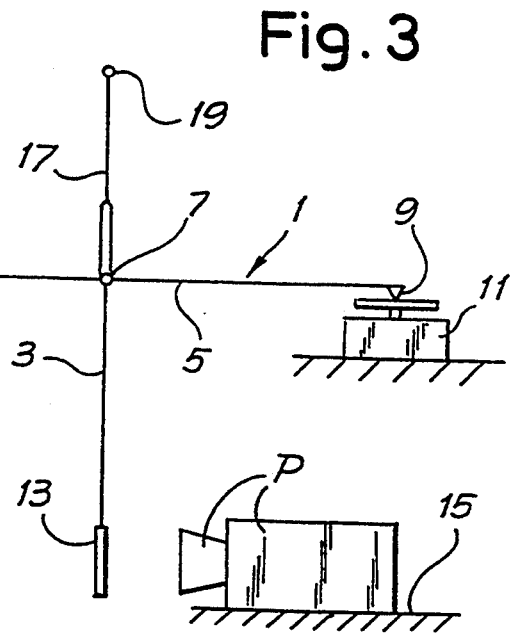
FIG. 3 shows a simplified diagram of the equipment according to the invention.

With initial reference to the simplified diagram in FIG. 3, the equipment according to the invention comprises basically a balance generally denoted 1, consisting of two arms 3 and 5 which are vertical and horizontal respectively, and which intersect at 7. At one end of the horizontal arm 5 there is provided a prod 9 which acts on a load cell 11 or a similar force sensor. At the lower end of the vertical arm 3 there is provided a target 13 which consists of a surface, which for example is circular, to which there is directed the jet emerging from a thruster P mounted on a supporting structure, which is mechanically free from the balance 1.

The balance 1 is supported by a thin thread 17 made of a suitable substance with very low flexural rigidity, which is attached at 19 to a supporting structure not shown.

The thrust of the thruster P is measured on the basis of the third law of motion, by making the jet which emerges from the thruster act on the target 13, and by balancing the force applied to the balance 1 by means of a reaction of constraint on the prod 9. This reaction of constraint is measured by the load cell 11. Since the lengths of the arms 5 and 3 are known, the force measured by the load cell 11 can be used to calculate the thrust exerted by the thruster P. The sensitivity of the equipment can be increased or reduced by selecting accordingly the lengths of the arms 3 and 5.

As shown in greater detail in FIGS. 4 and 5, on the balance 1 there are provided adjustable counterweights for correct positioning of the center of gravity of the balance 1, corresponding to the point of intersection 7 represented by the fulcrum, i.e. the point of pivoting of the balance. More particularly, on the lower branch of the arm 3 there is provided a pair of adjustable counterweights 21, whereas on the upper branch of the same vertical arm 3 there is provided a counterweight 23. 25 indicates a counterweight on the horizontal arm 5.

The target 13 is supported by an extension 3A of the vertical arm 3. The extension 3A constitutes a telescopic system for elongation of the arm, so that the target 13 can be positioned perfectly in line with the nozzle of the thruster P.

The above-described equipment in its entirety, comprising the base 15 for mounting the thruster P, and the balance 1, as well as the load cell 11, is disposed inside a vacuum chamber which is evacuated before the measurement is begun.

By providing suspension by means of a thread of very low flexural rigidity, which is attached to a point aligned vertically with the center of gravity 7 of the balance, which at the same time constitutes the fulcrum of the balance, friction exerted on the balance is kept to a minimum, and unknown forces which can affect adversely measurement of the thrust exerted by the thruster P, are thus substantially eliminated. In addition, since the thruster is separated from the balance, the gas supply lines and the electrical power cables do not exert any force on the balance.

The load cell 11 can be a commercially available highly sensitive cell, and is selected such that it can operate correctly under vacuum, and has a measurement range and level of accuracy suitable for the thrusts to be measured, which, as noted above, may be of approximately 1 mN. In addition, in order to eliminate the effects of friction and prevent misalignment during measuring from occurring between the target 13 and the axis of the jet obtained from the nozzle of the thruster P, the load cell 11 is selected such as to limit or eliminate displacements of the balance during measuring. This can be achieved by using a system of a known type, for correction of the displacement.

For this purpose the load cell can be selected from amongst those in which the displacement caused by the load is automatically cancelled out, being compensated for by a suitable reaction.

The electronics associated with the load cell 11 are disposed outside the test chamber which is placed under vacuum.

The structure of the balance can consist of rigid and very light material, for example carbon fiber. Similarly, the suspension cord 17 can also consist of carbon fiber or nylon (registered trademark) fiber. In the case of carbon fiber, which is electrically conductive, an electrically conductive path is produced which, by means of an ammeter, permits measurement of the current received by the target.

Figure 7:
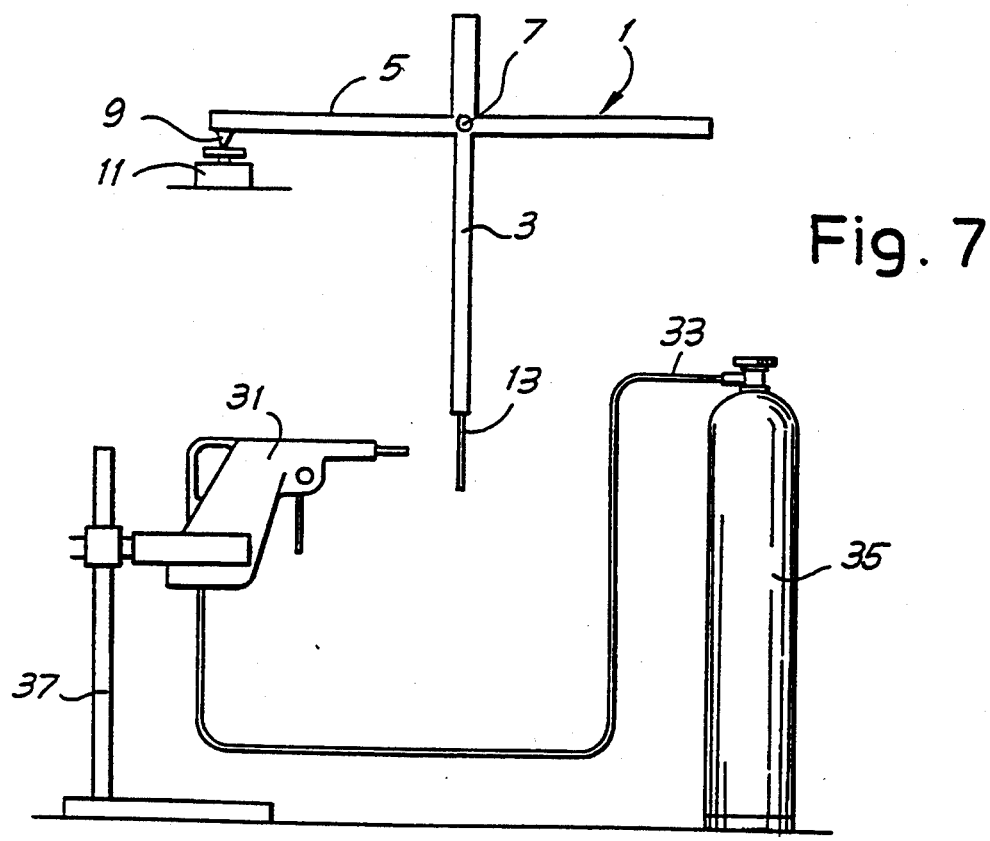

FIGS. 6 and 7 show two successive stages in the calibration of the above-described equipment, in order to ensure correct functioning thereof.

The calibration is performed in air, using the jet from a compressed air pistol 31 which is connected by means of a compressed air line 33 to a tank 35. 37 indicates a system which enables the pistol 31 to be positioned relative to the balance. The method comprises:

A) regulation and measurement of the thrust of the jet from the pistol 31, the jet from the pistol being aimed directly at the load cell (FIG. 6);

B) subsequent measurement of the thrust of the jet from the pistol 31, the pistol 31 being aimed at the target 13 of the vertical arm 3 of the balance 1 (FIG. 7).

In order to ensure that the thrust of the jet from the pistol 31 is identical during the above-described stages A and B, the test flow rate and the relative positioning (distance and perpendicularity) of the pistol and the load cell in the first stage, and of the pistol and the target in the second stage, must remain unchanged. The flow rate is controlled by means of a flow meter, whereas the position is set by means of the support 37.

Figure 1:
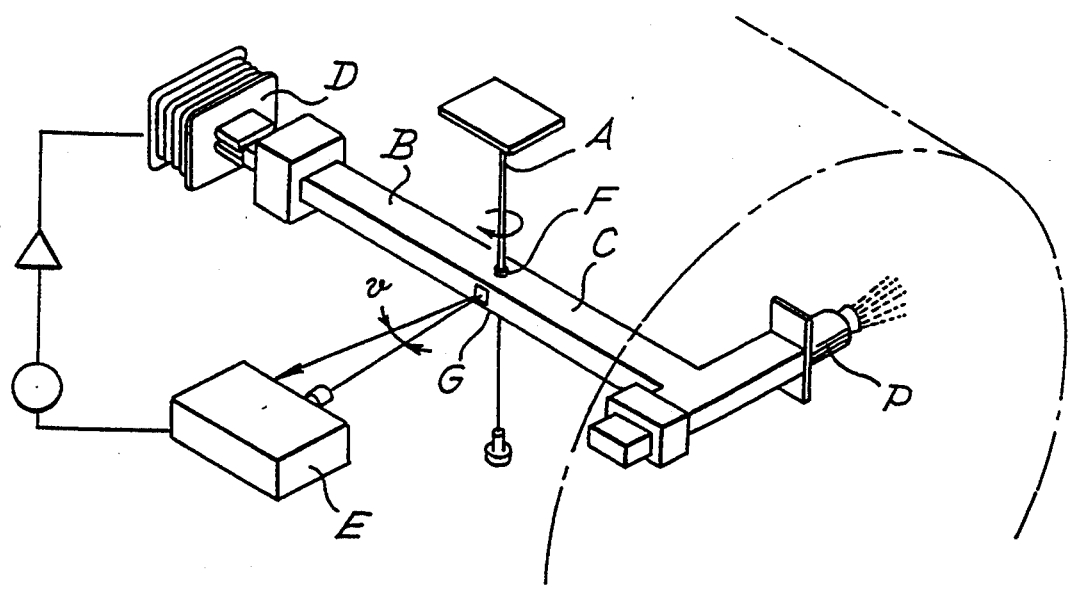
FIGS. 1 and 2 show two sets of equipment according to the state of the art.
Figure 2:
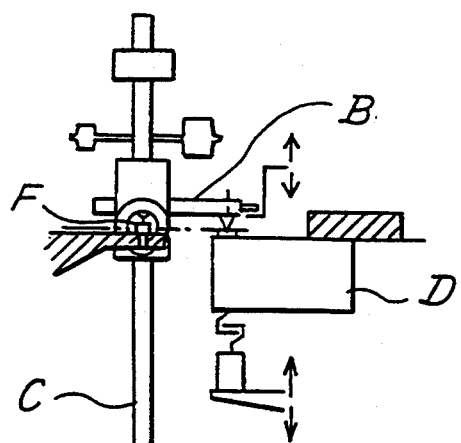
Figure 8:
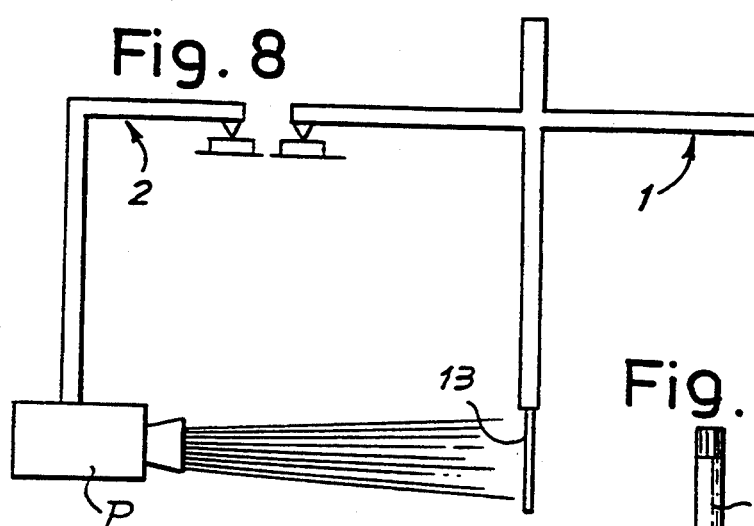
FIG. 8 shows a calibration operation according to a different method.

The above-described calibration system also permits determination of the sensitivity of the balance by means of the regulation in stage A, Which enables the flow rate of the pistol to be reduced until thrusts of a few hundredths of a mN are obtained. FIG. 8 shows a different arrangement for the calibration. In this case, a thruster P with suitable features is mounted on a conventional balance 2, of a type which is similar (for example) to that shown in FIG. 2. Adjacent to this first balance there is positioned the balance 1 to be calibrated, with its own target 13 in front of the thruster P. The measurement performed with the conventional balance 2 (already calibrated) is used to calibrate the balance 1.

In addition to measurement of the thrust of the thruster P, the above-described balance also permits acquisition of further data concerning the operation of the thruster, such as the divergence of the beam and the thrust vector (in its features of direction, intensity and orientation). In fact suspension from the thread 17 leaves the structure of the balance free to rotate around a vertical axis which coincides substantially with the axis of the arm 3. If the thruster P has been correctly positioned in relation to the target 13, two forces only are exerted on the balance 1, represented by the resultant of the pressures on the target 13 and by the reaction of the prod 9. These forces lie on the same plane and balance one another. If the thrust generated by the thruster P is not regular, the resultant of the pressures on the target 13 will no longer pass through the center of the target, and will thus give rise to torque which tends to make the structure of the balance rotate around the axis which passes through the arm 3.

If there is a measuring means, which can for example consist of a pair of load cells associated with the horizontal arm 5, the tendency of the balance to rotate around the vertical axis can be detected, and thus the existence of asymmetry of the jet from the thruster can be ascertained. In this case, if the thruster is rotated around its own axis, the exact direction of the thrust can be determined.

Figures 9A, 9B:
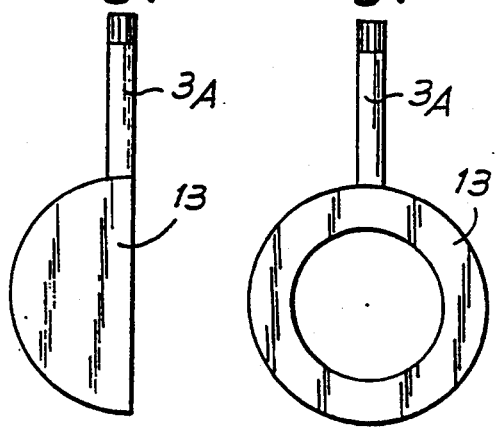
FIGS. 9A and 9B show different forms of the target which receives the beam emitted by the thruster.

Targets 13 with different shapes can be used, as schematized in FIGS. 9A and 9B, in order to determine the thrust on non-circular areas. The target in FIG. 9A for example enables the thrust exerted by a half beam to be determined, whereas the target in FIG. 9B enables the thrust on an area in the form of an annulus to be measured.

It will be understood that the drawings only show an example provided as a practical illustration of the invention, of which the forms and arrangements can be varied without departing from the concept on which the invention is based. The object of the presence of any reference numbers in the attached claims is to facilitate reading of the claims with reference to the description and to the drawings, and does not limit the scope of the protection represented by the claims.

I claim:

1. Equipment for measuring on earth the thrust of thrusters for use in space, comprising:
    a balance;
    measuring means for measuring a force, said measuring means being associated with said balance for measuring a thrust exerted by the thruster; and
    a target connected to the balance, a thruster being positioned to direct an exhaust gas jet at said target, the thruster being mechanically free from said balance, said measuring means for measuring a force applied to said balance corresponding to thrust exerted on said balance by said exhaust jet from the thruster.

2. Equipment according to claim 1, wherein said balance has a fulcrum of rotation, said fulcrum of rotation coinciding with a center of gravity of said balance.

3. Equipment according to claim 1, further comprising a flexible member with a low flexural rigidity, said flexible member having an end connected to a vertical member of said balance to suspend said balance along a vertical line which passes through a center of gravity of said balance.

4. Equipment according to claim 1, wherein said balance includes a structure in the form of a cross, said cross having a first arm attached to said target and a second arm, inclined relative to said first arm, said second arm being associated with said measuring means.

5. Equipment according to claim 4, wherein said first arm is vertical and said second arm is horizontal.

6. Equipment according to claim 1, further comprising adjustable counterweights disposed on said balance for adjustment of a position of a center of gravity of said balance wherein said center of gravity of said balance may be adjusted to coincide with a pivoting center of said balance.

7. Equipment according to claim 6, wherein said adjustable counterweights include a first system of counterweights for adjustment of the center of gravity in a vertical direction and a second system of counterweights for adjustment of the center of gravity in a horizontal direction.

8. Equipment according to claim 7, further comprising a third system of counterweights for adjustment of a center of gravity in a second horizontal direction.

9. Equipment according to claim 1, further comprising adjustment means, connected to said balance, for adjusting a position of said target relative to said balance.

10. Equipment according to claim 1, wherein said measuring means is a load cell with displacement compensation.

11. Equipment according to claim 1, further comprising a vacuum chamber and a thruster support, said thruster, said thruster support, said balance and said load cell being disposed within said vacuum chamber.

12. Equipment according to claim 1, wherein said target is formed of a surface for receiving a partial portion of the exhaust jet from the thruster.

13. Method for measuring on earth the thrust of a thruster for use in space, comprising the steps of:
    providing a balance with a means of measuring a reaction of constraint exerted on the balance;
    providing a target on said balance;
    mounting the thruster independently of said balance;
    starting up the thruster and directing an exhaust jet from the thruster at the target mounting on said balance; and
    measuring the reaction exerted on the balance in order to balance a thrust exerted on the balance by the exhaust jet from the thruster.

14. Method according to claim 13, wherein a center of gravity of the balance is disposed so as to correspond with a fulcrum of the balance.

15. Method according to claim 13, wherein the balance is maintained still during measurement by cancelling out displacement otherwise caused by a torque exerted by the exhaust jet of the thruster.

16. Method according to claim 13, wherein force components other than axial components of the exhaust jet are measured by measuring movement of the balance around an axis at right angles to an axis of oscillation of a fulcrum of the balance.

17. Method according to claim 16, wherein said radial force components are measured at a plurality of angular positions of the thruster, by rotating the thruster gradually around a theoretical axis of the exhaust jet and by determining a direction of a resultant of the thrust of the exhaust jet.

18. Method according to claim 13, further comprising a calibration stage comprising:
    directing a jet of compressed air at the measuring means;
    regulating the jet of compressed air and measuring the regulated jet; and
    directing the jet against the target of the balance and measuring the thrust exerted on the balance at the measuring means.

19. Method according to claim 13, further comprising a preliminary stage of calibration of the balance comprising the steps of:
    mounting a thruster with known characteristics on another already calibrated balance;

positioning the balance to be calibrated adjacent to the other already calibrated balance;

starting up the thruster and directing the exhaust jet of the thruster oriented toward the target; and measuring the thrust by the already calibrated balance and using this measurement as a value for calibration of the balance.

20. Method according to claim 19, wherein the thrust is measured at variable distances between the source of the jet of compressed air and the target.

* * * * *